US008911870B2

United States Patent
Lee et al.

(10) Patent No.: US 8,911,870 B2
(45) Date of Patent: Dec. 16, 2014

(54) METHOD TO PRODUCE MATTE AND OPAQUE BIAXIALLY ORIENTED POLYLACTIC ACID FILM

(75) Inventors: Mark S. Lee, North Kingstown, RI (US); Harold E. Koehn, North Kingstown, RI (US); Takeshi Mizumura, East Greenwich, RI (US); Keunsuk P. Chang, North Kingstown, RI (US)

(73) Assignee: Toray Plastics (America), Inc., N. Kingstown, RI (US)

( * ) Notice: Subject to any disclaimer, the term of this patent is extended or adjusted under 35 U.S.C. 154(b) by 556 days.

(21) Appl. No.: 12/483,072

(22) Filed: Jun. 11, 2009

(65) Prior Publication Data

US 2009/0311544 A1     Dec. 17, 2009

Related U.S. Application Data

(60) Provisional application No. 61/061,428, filed on Jun. 13, 2008.

(51) Int. Cl.
  *B32B 27/08*     (2006.01)
  *B32B 27/18*     (2006.01)
  (Continued)

(52) U.S. Cl.
  CPC ............ *B32B 27/36* (2013.01); *B29C 47/0021* (2013.01); *B29C 47/065* (2013.01); *B29K 2105/256* (2013.01); *B29L 2009/00* (2013.01); *Y10S 428/91* (2013.01)
  USPC ........... 428/458; 428/323; 428/327; 428/328; 428/329; 428/330; 428/331; 428/304.4; 428/315.5; 428/317.9; 428/318.4; 428/319.3; 428/319.7; 428/480; 428/910

(58) Field of Classification Search
  None
  See application file for complete search history.

(56) References Cited

U.S. PATENT DOCUMENTS 4,879,440 A * 11/1989 Lymburner ................ 200/82 R
5,536,807 A * 7/1996 Gruber et al. ............. 528/354
(Continued)

FOREIGN PATENT DOCUMENTS

EP     1385899     2/2004

OTHER PUBLICATIONS

International Seach Report and Written Opinion mailed on Jul. 31, 2009 directed at counterpart application No. PCT/US09/47198; 8 pages.

(Continued)

*Primary Examiner* — Vivian Chen
(74) *Attorney, Agent, or Firm* — Morrison & Foerster LLP

(57) ABSTRACT

A biaxially oriented laminate film including a core layer including a blend of crystalline polylactic acid polymer and an inorganic antiblock particle which is biaxially oriented at low transverse direction orientation temperatures to impart a degree of cavitation around the particles such that a matte or opaque appearance is obtained. The laminate film may further have additional layers such as a heat sealable layer disposed on one side of the core layer including an amorphous polylactic acid resin and/or a polylactic acid resin-containing layer disposed on the side of the core layer opposite the heat sealable layer, a metal layer, or combinations thereof.

17 Claims, 3 Drawing Sheets

(51) Int. Cl.
*B32B 27/20* (2006.01)
*B32B 27/36* (2006.01)
*B32B 15/04* (2006.01)
*B32B 15/08* (2006.01)
*B32B 15/09* (2006.01)
*C08L 67/04* (2006.01)
*C08K 3/10* (2006.01)
*C08K 3/26* (2006.01)
*C08K 3/34* (2006.01)
*C08K 3/36* (2006.01)
*B29C 47/00* (2006.01)
*B29C 47/06* (2006.01)
*B29K 105/00* (2006.01)
*B29L 9/00* (2006.01)

(56) References Cited

U.S. PATENT DOCUMENTS

| | | | |
|---|---|---|---|
| 5,677,055 A | 10/1997 | Ohkawachi et al. | |
| 5,849,374 A * | 12/1998 | Gruber et al. | 428/34.3 |
| 5,849,401 A * | 12/1998 | El-Afandi et al. | 428/215 |
| 6,005,068 A | 12/1999 | Gruber et al. | |
| 6,114,495 A * | 9/2000 | Kolstad et al. | 528/354 |
| 6,153,276 A * | 11/2000 | Oya et al. | 428/35.2 |
| 6,164,011 A * | 12/2000 | Gaudreault et al. | 47/9 |
| 6,183,814 B1 * | 2/2001 | Nangeroni et al. | 427/361 |
| 6,808,795 B2 | 10/2004 | Noda et al. | |
| 6,815,079 B2 * | 11/2004 | Rosenbaum et al. | 428/480 |
| 6,844,077 B2 * | 1/2005 | Squier et al. | 428/457 |
| 6,958,860 B2 * | 10/2005 | Dontula et al. | 359/599 |
| 6,960,374 B1 | 11/2005 | Terada et al. | |
| 7,078,367 B2 | 7/2006 | Laney et al. | |
| 7,078,368 B2 | 7/2006 | Laney et al. | |
| 7,094,733 B2 | 8/2006 | Laney et al. | |
| 7,128,969 B2 | 10/2006 | Busch et al. | |
| 7,199,173 B2 * | 4/2007 | Shimizu et al. | 524/425 |
| 7,241,832 B2 | 7/2007 | Khemani et al. | |
| 7,273,894 B2 * | 9/2007 | Shelby et al. | 521/134 |
| 7,294,380 B2 | 11/2007 | Squier et al. | |
| 7,354,973 B2 * | 4/2008 | Flexman | 525/162 |
| 7,368,160 B2 * | 5/2008 | Inglis | 428/212 |
| 7,381,772 B2 * | 6/2008 | Flexman et al. | 525/163 |
| 7,820,276 B2 * | 10/2010 | Sukigara et al. | 428/212 |
| 7,879,440 B2 | 2/2011 | Yatsuzuka et al. | |
| 7,927,532 B2 * | 4/2011 | Scheer | 264/176.1 |
| 7,951,428 B2 * | 5/2011 | Hoerr et al. | 427/483 |
| 8,231,978 B2 | 7/2012 | Busch et al. | |
| 8,808,854 B2 * | 8/2014 | Lee | 428/349 |
| 8,815,390 B2 * | 8/2014 | Lee | 428/349 |
| 2003/0039775 A1 * | 2/2003 | Kong | 428/34.9 |
| 2004/0185282 A1 * | 9/2004 | Rosenbaum et al. | 428/480 |
| 2005/0112351 A1 * | 5/2005 | Laney et al. | 428/304.4 |
| 2005/0112352 A1 * | 5/2005 | Laney et al. | 428/304.4 |
| 2005/0287358 A1 | 12/2005 | Inglis | |
| 2006/0068200 A1 * | 3/2006 | Cleckner et al. | 428/347 |
| 2006/0246108 A1 | 11/2006 | Pacetti et al. | |
| 2007/0020448 A1 * | 1/2007 | Hubbard et al. | 428/304.4 |
| 2009/0148715 A1 * | 6/2009 | Lee | 428/480 |
| 2010/0009208 A1 * | 1/2010 | Lee | 428/483 |
| 2010/0247886 A1 | 9/2010 | Lee et al. | |
| 2010/0323196 A1 * | 12/2010 | Dou et al. | 428/349 |
| 2010/0330382 A1 * | 12/2010 | Dou et al. | 428/457 |
| 2011/0244185 A1 * | 10/2011 | Dou et al. | 428/156 |
| 2011/0244186 A1 * | 10/2011 | Dou et al. | 428/156 |
| 2011/0244257 A1 * | 10/2011 | Paulino et al. | 428/461 |
| 2012/0128973 A1 * | 5/2012 | Lee et al. | 428/349 |
| 2012/0128974 A1 | 5/2012 | Lee | |
| 2012/0141766 A1 | 6/2012 | Paulino et al. | |
| 2013/0122280 A1 | 5/2013 | Yokota et al. | |

OTHER PUBLICATIONS

Lee et al., U.S. Office Action mailed Sep. 18, 2012, directed to U.S. Appl. No. 13/362,991; 10 pages.

Mexican Office Action dated Jun. 3, 2013, directed to MX Application No. MX/a/2010/013666; 3 pages.

Lee et al., U.S. Office Action mailed Apr. 11, 2013, directed to U.S. Appl. No. 13/362,991; 10 pages.

Lee et al., U.S. Office Action mailed Nov. 8, 2013, directed to U.S. Appl. No. 13/362,991; 8 pages.

Lee et al., U.S. Office Action mailed Apr. 24, 2014, directed to U.S. Appl. No. 13/362,991; 10 pages.

\* cited by examiner

METHOD TO PRODUCE MATTE AND OPAQUE BIAXIALLY ORIENTED POLYLACTIC ACID FILM

CROSS-REFERENCE TO RELATED APPLICATION

This application claims the benefit of U.S. Provisional Application Ser. No. 61/061,428, filed Jun. 13, 2008, the entirety of which is incorporated herein by reference.

FIELD OF INVENTION

This invention relates to a multi-layer biaxially oriented polylactic acid (BOPLA) film with a novel formulation and process which can exhibit a matte or white opaque appearance.

BACKGROUND OF INVENTION

Biaxially oriented polypropylene (BOPP) films used for packaging, decorative, and label applications often perform multiple functions. For example, in laminations they can provide printability, transparent or matte appearance, and/or slip properties. They can further be used to provide a surface suitable for receiving organic or inorganic coatings for gas and moisture barrier properties. They can also be used to provide a heat sealable layer for bag forming and sealing, or a layer that is suitable for receiving an adhesive either by coating or laminating.

However, in recent years, interest in "greener" packaging has been developing. Packaging materials based on biologically derived polymers are increasing due to concerns with renewable resources, raw materials, and greenhouse gases. Bio-based polymers are believed—once fully scaled-up—to help reduce reliance on petroleum, reduce production of greenhouse gases, and can be biodegradable. The biodegradable aspect is of interest to many snack manufacturers so as to provide litter abatement in addition to a lower carbon footprint package. Bio-based polymers such as polylactic acid (PLA)—which is currently derived from corn starch (but can be derived from other plant sugars) and thus, can be considered to be derived from a renewable or sustainable resource—is one of the more popular and commercially available materials available for packaging film applications. Other bio-based polymers such as polyhydroxyalkanoates (PHA) and particularly, polyhydroxybutyrate (PHB) are also of high interest.

Typically, BOPLA films are generally transparent with a high clarity and high gloss. In some packaging applications, this is very desirable for printing graphics with high visual appeal—or "pop"—and to provide high resolution of the images desired. PLA, being a polar polymer, naturally has a high surface energy which helps enable good wettability of the types of printing inks and colors used in packaging. However, there is also a desire in the packaging industry for a non-glossy, matte appearance film for certain graphic applications. A printed matte film typically gives a "paper-like" appearance to the package which has a certain aesthetic advantage and attractiveness for some applications.

Unfortunately, biaxially oriented PLA (BOPLA) film has been found to be limited to relatively low orientation rates when compared to BOPP manufacturing. This has an impact on productivity and cost. Because polylactic acid polymers are highly polar, it has been found that to effectively make BOPLA films, orientation rates typically found with biaxially oriented polyester (OPET) films must be used, e.g. roughly 3× in the machine direction (MD) and 3× in the transverse direction (TD). If BOPLA films are oriented in the transverse direction higher than a nominal 3 or 4×, film breaks are prone to occur and production of BOPLA films cannot be achieved. However, since BOPLA has been targeted to potentially replace BOPP in packaging, the potential cost of BOPLA due to this reduced productivity may be too high allow for BOPLA to effectively replace BOPP.

BOPP film manufacturing typically has a MD orientation rate of 4-5× and a TD orientation rate of 8-10×. Thus, BOPP films are produced much wider than BOPLA films and have a higher production output and customer width programming. Couple this lower productivity with the current price of PLA resin being higher than polypropylene resin, and BOPLA films suffer a severe cost disadvantage.

For BOPP films, matte appearance is generally achieved by using a resin mixture of incompatible resins. Popular blends commercially available generally use a blend of propylene homopolymer with ethylene homopolymer, with low density polyethylene, medium density polyethylene, or high density polyethylene being used. Also commercially available and used are block copolymers of ethylene and propylene which can give a matte appearance. Alternatively, there are also mineral fillers that can be used to give a matte appearance to the film, such as fine talcs or clays U.S. Pat. No. 7,128,969 describes a film composed of a base layer of PLA with a minority component of a thermoplastic or polyolefin such as polypropylene or polyethylene, typically less than 1% by weight of the base layer. Such a formulation is particularly suitable for thermoforming or biaxial stretching by means of pneumatic drawing or other mechanical forming. However, the formulation is not suitable for high transverse orientation rates in excess of 6 TDX; the highest TDX cited in the examples is 5.5. In addition, the small amount of polyolefin used as a drawing aid in the PLA base layer is not enough to produce a suitably consistent matte appearance.

EP Patent No. 01385899 describes a multi-layer film design using a PLA base layer formulated with a cyclic polyolefin copolymer (COC) as a cavitating agent to produce an opaque biaxially oriented PLA film. However, this invention uses a cavitating agent that can be costly to use.

U.S. patent application Ser. No. 12/333,047, the entire contents of which is herein incorporated by reference, describes the use of ethylene-methacrylate copolymers as a process aid to increase significantly the transverse orientation rate of biaxially oriented PLA films. However, the resulting films are transparent, not matte or opaque.

SUMMARY OF THE INVENTION

Figure 1:
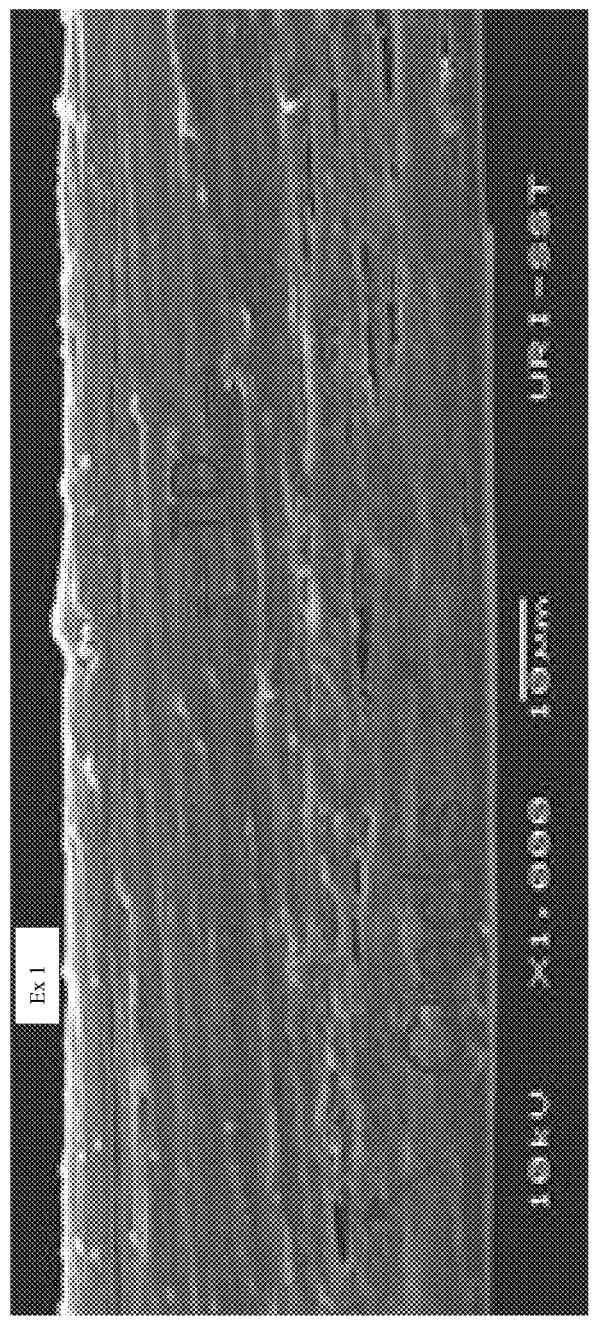
FIG. 1 is a scanning electron microscope (SEM) image of the cross-section of the film of Example 1 showing some slight cavitation and cracking around the antiblock particles.

The above issues of making matte or opaque biaxially oriented PLA films in a productive manner without incurring potential appearance issues such as non-uniform appearance or gels due to using incompatible additives are addressed. Embodiments include an unexpected combination of processing conditions, high transverse orientation rates enabled by a unique processing aid, and inexpensive inorganic cavitating agent. This combination of features results in consistent and uniformly fine matte or opaque films. One embodiment is a multi-layer laminate film including a first layer of a heat sealable resin including an amorphous PLA resin and a second layer including a substantially crystalline PLA resin-containing blend on one side of the sealable amorphous PLA layer. This second crystalline PLA resin-containing blend layer may be considered a core or base layer to provide the bulk strength of the laminate film. The second PLA core layer may include a blend of crystalline PLA homopolymer combined with an optional amount of ethylene-acrylate copolymer that acts as a processing aid to enable high transverse orientation rates of 8-11×. The second PLA core layer may also include an optional amount of amorphous PLA blended with the crystalline PLA. The second PLA core layer also includes inorganic antiblock particles of suitable size, selected from amorphous silicas, aluminosilicates, sodium calcium aluminum silicates, crosslinked silicone polymers, and/or polymethylmethacrylates to act as the matte or opacifying agent. Additional inorganic particles may include calcium carbonate, talcs, and micas. Suitable amounts range from 0.03-5.0% by weight of the core layer and typical particle sizes of 3.0-6.0 µm in diameter.

The first heat layer may an PLA which provides heat sealable properties to the laminate and also may include various additives such as antiblock particles to allow for easier film handling. Furthermore, the laminate may further include a third PLA resin-containing layer on the second PLA resin-containing core layer opposite the side with the amorphous PLA sealable layer for use as a printing layer or metal receiving layer or coating receiving layer. This third layer of this laminate may include either an amorphous PLA or a crystalline PLA, or blends thereof.

Preferably, the second PLA resin-containing core layer includes a crystalline polylactic acid homopolymer of about 90-100 wt % L-lactic acid units (or 0-10 wt % D-lactic acid units). An optional amount of amorphous PLA may also be blended in with the crystalline PLA from 0-48 wt % of the core layer. The amorphous PLA is also based on L-lactic acid units but has greater than 10 wt % D-lactic acid units and/or meso-lactide units (which includes one each of L and D lactic acid residuals). An optional amount of ethylene-acrylate copolymer can also be added to the core layer at about 2-10 wt % of the core layer as a process aid for orientation, particularly transverse orientation.

Added to the core layer are inorganic antiblock particles of suitable size, selected from amorphous silicas, aluminosilicates, sodium calcium aluminum silicates, calcium carbonate, talc, mica, crosslinked silicone polymers, and/or polymethylmethacrylates to provide the matte or opaque appearance desired after transverse orientation. Suitable amounts may range from 0.03-5.0% by weight of the core layer, preferably 0.05-0.50 wt % (500-5000 ppm) and typical particle sizes of 3.0-6.0 µm in diameter. Migratory slip additives may also be contemplated to control COF properties such as fatty amides (e.g. erucamide, stearamide, oleamide, etc.) or silicone oils ranging from low molecular weight oils to ultra high molecular weight gels. Suitable amounts of slip additives to use can range from 300 ppm to 10,000 ppm of the layer.

Preferably, the first PLA heat sealable resin-containing layer includes an amorphous PLA of greater than 10 wt % D-lactic acid units. It is not necessary to use any of the impact modifier/process aid ethylene-acrylate copolymer in this case, as the amorphous PLA can be oriented relatively easily. This first heat sealable amorphous PLA resin-containing layer can also include an antiblock component selected from amorphous silicas, aluminosilicates, sodium calcium aluminum silicates, crosslinked silicone polymers, and polymethylmethacrylates to aid in machinability and winding and to lower coefficient of friction (COF) properties. Suitable amounts may range from 0.03-0.5% by weight of the heat sealable layer and typical particle sizes of 3.0-6.0 µm in diameter, depending on the final thickness of this layer. Migratory slip additives may also be contemplated to control COF properties such as fatty amides (e.g. erucamide, stearamide, oleamide, etc.) or silicone oils ranging from low molecular weight oils to ultra high molecular weight gels. Suitable amounts of slip additives to use can range from 300 ppm to 10,000 ppm of the layer.

Another embodiment may have this first PLA resin-containing layer include anon-heat-sealable amorphous PLA such as a crystalline PLA resin similar to that used in the second PLA resin-containing core layer. In addition, various blends of amorphous and crystalline PLA can be contemplated at similar ratios as described for the core layer. In the case that a crystalline PLA is used or a blend including crystalline PLA, an optional amount of the ethylene-acrylate copolymer process aid may be used, again in the amount of 2-10 wt % of this layer to enable transverse orientation at high rates. Preferably, this layer also contains antiblock particles selected from amorphous silicas, aluminosilicates, sodium calcium aluminum silicates, crosslinked silicone polymers, and polymethylmethacrylates to aid in machinability and winding. Suitable amounts range from 0.03-0.5% by weight of the core layer and typical particle sizes of 3.0-6.0 µm in diameter, depending on the final thickness of this layer. Migratory slip additives may also be contemplated to control COF properties such as fatty amides (e.g. erucamide, stearamide, oleamide, etc.) or silicone oils ranging from low molecular weight oils to ultra high molecular weight gels, or blends of fatty amides and silicone oil-based materials. Suitable amounts of slip additives to use can range from 300 ppm to 10,000 ppm of the layer.

In yet another embodiment, the second PLA resin-containing core layer may be extruded by itself as a single layer only. As mentioned previously, this layer includes a crystalline polylactic acid homopolymer of about 90-100 wt % L-lactic acid units (or 0-10 wt % D-lactic acid units). An optional amount of amorphous PLA may also be blended in with the crystalline PLA from 0-48 wt % of the core layer. The amorphous PLA is also based on L-lactic acid units but has greater than 10 wt % D-lactic acid units and/or meso-lactide units (which includes one each of L and D lactic acid residuals). An optional amount of ethylene-acrylate copolymer can also be added to the core layer at about 2-10 wt % of the core layer as a process aid for orientation, particularly transverse orientation. Added to the core layer are antiblock particles of suitable size, selected from the group consisting of amorphous silicas, aluminosilicates, sodium calcium aluminum silicates, calcium carbonate, talc, mica, crosslinked silicone polymers, and/or polymethylmethacrylates to provide the matte or opaque appearance desired after transverse orientation. Suitable amounts range from 0.03-5.0% by weight of the core layer, preferably 0.05-0.50 wt %, and typical particle sizes of 3.0-6.0 µm in diameter. Migratory slip additives may also be utilized to control COF properties such as fatty amides (e.g. erucamide, stearamide, oleamide, etc.) or silicone oils ranging from low molecular weight oils to ultra high molecular weight gels. Suitable amounts of slip additives to use can range from 300 ppm to 10,000 ppm of the layer.

In the case where the above embodiments are to be used as a substrate for vacuum deposition metallizing, it is preferred that migratory slip additives not be used as these types of materials may adversely affect the metal adhesion or metallized gas barrier properties of the metallized BOPLA film. It is thought that as the hot metal vapor condenses on the film substrate, such fatty amides or silicone oils on the surface of the film may vaporize and cause pin-holing of the metal-deposited layer, thus compromising gas barrier properties. Thus, only non-migratory antiblock materials can be used to control COF and web-handling.

In the case where embodiments are to be used as a printing film, it may be advisable to avoid the use of silicone oils, in particular low molecular weight oils, as these may interfere with the print quality of certain ink systems used in process printing applications. However, this depends greatly upon the ink system and printing process used.

It is preferable to discharge-treat the side of this multi-layer film structure opposite the heat sealable first layer for lamination, metallizing, printing, or coating. In the case of a 2-layer laminate structure wherein the amorphous PLA sealable layer is contiguous with a crystalline PLA core layer, it is preferable to discharge-treat the side of the core layer opposite the sealable layer for purposes of laminating, printing, metallizing, coating, etc. In the case of a 3-layer laminate structure, it is preferable to discharge-treat the side of the third layer which is contiguous to the side of the core layer opposite the heat sealable first layer. This third layer, as mentioned previously, may be formulated with materials that are conducive to receiving printing inks, metallizing, adhesives, or coatings. In the case of a single layer film, either or both sides of the film can be discharge-treated as desired.

Discharge-treatment in the above embodiments can be accomplished by several means, including but not limited to corona, flame, plasma, or corona in a controlled atmosphere of selected gases. Preferably, in one variation, the discharge-treated surface has a corona discharge-treated surface formed in an atmosphere of $CO_2$ and $N_2$ to the exclusion of $O_2$. The laminate film embodiments may further include a vacuum-deposited metal layer on the discharge-treated layer's surface. Preferably, the metal layer has a thickness of about 5 to 100 nm, has an optical density of about 1.5 to 5.0, and includes aluminum, although other metals can be contemplated such as titanium, vanadium, chromium, manganese, iron, cobalt, nickel, copper, zinc, gold, or palladium, or alloys or blends thereof.

Preferably, the laminate film is produced via coextrusion of the heat sealable layer and the blended core layer and other layers if desired, through a compositing die whereupon the molten multilayer film structure is quenched upon a chilled casting roll system or casting roll and water bath system and subsequently oriented in the machine and/or transverse direction into an oriented multi-layer film. Machine direction orientation rate is typically 2.0-3.0× and transverse direction orientation—with the use of the ethylene-acrylate impact modifier process aid—is typically 8.0-11.0×. Otherwise, without the ethylene-acrylate impact modifier process aid, transverse direction orientation may be limited to a lower rate, typically 3.0-6.0×. Heat setting conditions in the TDO oven is also critical to minimize thermal shrinkage effects.

The Multi-layer BOPLA film may be made, for example, using a 3-meter wide sequential orientation line process via coextrusion through a die, casting on a chill drum using an electrostatic pinner, oriented in the machine direction through a series of heated and differentially sped rolls, followed by transverse direction stretching in a tenter oven.

The multilayer coextruded laminate sheet may be coextruded at processing temperatures of ca. 170° C. to 230° C. through a die and cast onto a cooling drum whose surface temperature may be controlled between 15° C. and 26° C. to solidify the non-oriented laminate sheet at a casting speed of about 13-17 mpm. The non-oriented laminate sheet may be stretched in the longitudinal direction at about 60° C. to 70° C. at a stretching ratio of about 2 to about 3 times the original length and the resulting stretched sheet may be annealed at about 45° C. to 55° C. to obtain a uniaxially oriented laminate sheet.

The uniaxially oriented laminate sheet may be introduced into a tenter at a linespeed of ca. 40 to 50 mpm and preliminarily heated between about 65° C. and 75° C., and stretched in the transverse direction at about 75° C. to 90° C. at a stretching ratio of about 3-10 times the original width and then heat-set or annealed at about 90° C. to 135° C. to reduce internal stresses due to the orientation and minimize shrinkage and give a relatively thermally stable biaxially oriented sheet.

To enable the matte or opaque appearance, it is preferable to transversely stretch the laminate film at a relatively low temperature, preferably 75-80° C. for the given linespeed. Transverse direction orientation rate is preferably 3-10 times, more preferably 6-10 times using the optional ethylene-acrylate process aid or, if not using the processing aid, more preferably at 4-6 times. To render a film that is more opaque in appearance, it is preferable to increase the machine direction orientation, preferably about 3.0 times the original length. To render the film more matte (and less opaque) in appearance, it is preferable to decrease the machine direction orientation, preferably about 2.4 times the original length.

The biaxall orientation process can be used to impart a degree of cavitation around the antiblock particles such that the core layer exhibits a gloss at 60° of less than 80% and wherein the film possesses light transmission of less than 90%.

The films may be metallized via vapor-deposition, preferably a vapor-deposited aluminum layer, with an optical density of at least about 1.5, preferably with an optical density of about 2.0 to 4.0, and even more preferably between 2.3 and 3.2. Optionally, an additional third layer specifically formulated for metallizing to provide adequate metal adhesion, metal gloss, and gas barrier properties can be disposed on the second PLA resin-containing core layer, opposite the side with the heat sealable layer. Additionally, this additional layer's surface may also be modified with a discharge treatment to make it suitable for metallizing, laminating, printing, or converter applied adhesives or other coatings.

Additional advantages of this invention will become readily apparent to those skilled in the art from the following detailed description, wherein only the preferred embodiments of this invention is shown and described, simply by way of illustration of the best mode contemplated for carrying out this invention. As will be realized, this invention is capable of other and different embodiments, and its details are capable of modifications in various obvious respects, all without departing from this invention. Accordingly, the examples and description are to be regarded as illustrative in nature and not as restrictive.

DETAILED DESCRIPTION OF THE INVENTION

Described are multi-layer biaxially oriented polylactic acid (BOPLA) films with a novel formulation and methods of making the same. The film formulations and process conditions may be used to form films that exhibit a matte or white opaque appearance. The films may include specific additives as a minority component in the film formulation and be formed utilizing processing conditions that enable the BOPLA films to become slightly cavitated resulting in a matte or opaque appearance which can provide unique aesthetic appearances for printing or other graphic arts use of BOPLA films.

Appealing, consistent, and fine matte appearance BOPLA films may be cost-effectively and productively produced by utilizing 1) an optional process aid to enable high machine and transverse orientation rates; 2) low transverse orientation temperatures; and 3) an inorganic antiblock material in the core layer of the PLA film. It is also possible to produce appealing and consistent appearance opaque BOPLA film in the same manner by modifying these factors.

In one embodiment, the laminate film includes a 2-layer coextruded film of: A PLA resin core layer including a crystalline polylactic acid polymer, optionally blended with an amount of an amorphous PLA polymer, an optional amount of ethylene-acrylate copolymer, and an amount of inorganic antiblock particle; and a heat sealable layer including of an amorphous polylactic acid polymer; and the side of the crystalline PLA core layer blend opposite the sealable resin layer is discharge-treated.

Another embodiment of the inventive laminate film includes a similar construction as above, except that a third PLA skin layer may be disposed on the side of the crystalline PLA/inorganic antiblock particle core layer blend opposite the heat sealable amorphous PLA layer. This third PLA layer can include either crystalline PLA resin or amorphous PLA resin or blends thereof. In the case where crystalline PLA resin is part of this layer's formulation, an amount of ethylene-acrylate copolymer can be incorporated as in the core layer formulation. Preferably, the exposed surface of this third layer is discharge-treated in order to provide further functionality as a surface to receive metallization, printing, coating, or laminating adhesives.

The polylactic acid resin core layer is a crystalline polylactic acid of a specific optical isomer content and can be biaxially oriented. As described in U.S. Pat. No. 6,005,068, lactic acid has two optical isomers: L-lactic acid (also known as (S)-lactic acid) and D-lactic acid (also known as (R)-lactic acid). Three forms of lactide can be derived from these lactic acid isomers: L,L-lactide (also known as L-lactide) and which includes two L-lactic acid residuals; D,D-lactide (also known as D-lactide) and which includes two D-lactic acid residuals; and meso-lactide which includes one each of L and D-lactic acid residuals.

The degree of crystallinity is determined by relatively long sequences of a particular residual, either long sequences of L or of D-lactic acid. The length of interrupting sequences is important for establishing the degree of crystallinity (or amorphous) and other polymer features such as crystallization rate, melting point, or melt processability. The crystalline polylactic acid resin preferably is one that includes primarily of the L-lactide isomer with minority amounts of either D-lactide or meso-lactide or combinations of D-lactide and meso-lactide. Preferably, the minority amount is D-lactide and the amount of D-lactide is 10 wt % or less of the crystalline PLA polymer. More preferably, the amount of D-lactide is less than about 5 wt %, and even more preferably, less than about 2 wt %.

Suitable examples of crystalline PLA for this invention include Natureworks® Ingeo™ 4042D and 4032D. These resins have relative viscosity of about 3.9-4.1, a melting point of about 165-173° C., a crystallization temperature of about 100-120° C., a glass transition temperature of about 55-62° C., a D-lactide content of about 4.25 wt % and 1.40 wt % respectively, density of about 1.25 g/cm$^3$, and a maximum residual lactide in the polylactide polymer of about 0.30% as determined by gas chromotography. Molecular weight $M_w$ is typically about 200,000; $M_n$ typically about 100,000; polydispersity about 2.0. Natureworks™ 4032D may be the more preferred crystalline PLA resin, being more crystalline than 4042D and more suitable for high heat biaxial orientation conditions. In addition, the 4042D PLA grade contains about 1000 ppm of erucamide and for some applications, particularly for gas barrier metallizing, may not be suitable.

The core resin layer is typically 8 μm to 100 μm in thickness after biaxial orientation, preferably between 10 μm and 50 μm, and more preferably between about 15 μm and 25 μm in thickness. A preferred embodiment is to use the higher crystalline, higher L-lactide content PLA (lower wt % D-lactide of about 1.40) such as Natureworks® 4032D.

The core layer can also optionally include an amount of amorphous PLA resin to improve further extrusion processing and oriented film processing. The addition of amorphous PLA in the core layer helps to lower extrusion polymer pressure and in terms of film manufacturing, helps to reduce or slow crystallization rate of the newly oriented film. This aids in the orientation of the PLA film in both MD and TD and helps reduce defects such as uneven stretch marks. It also helps with the slitting of the biaxially oriented film at the edge-trimming section of the line by reducing the brittleness of the edge trim and reducing the instances of edge trim breaks which can be an obstacle to good productivity.

The amorphous PLA is preferably based on a L-lactide isomer with D-lactide content of greater than 10 wt %. A suitable amorphous PLA to use is Natureworks® Ingeo™ 4060D grade. This resin has a relative viscosity of about 3.25-3.75, $T_g$ of about 52-58° C., seal initiation temperature of about 80° C., density of about 1.24 g/cm$^3$, a D-lactide content of about 12 wt %, and a maximum residual lactide in the polylactide polymer of about 0.30% as determined by gas chromatography. Molecular weight $M_w$ is about 180,000. Suitable amounts of amorphous PLA to use in the core are concentrations of up to about 48 wt % of the core layer, preferably up to about 30 wt % of the core layer, and even more preferably about 15-20 wt % of the core layer.

It should be noted, however, that too much amorphous PLA in the core layer (e.g. 50% or greater) can cause high thermal shrinkage rates after biaxial orientation and in spite of heat-setting conditions in the transverse orientation oven to make a thermally stable film. A thermally, dimensionally stable film is important if the substrate is to be used as a metallizing, printing, coating, or laminating substrate. (However, if the BOPLA is desired as a shrinkable film, this composition and appropriate processing conditions might be suitable.)

An optional component of the invention is blending into the core layer a minority amount of ethylene-acrylate copolymer as a processing aid in orientation, in particular, to enable high transverse orientation rates (TDX) similar to that used in BOPP orientation (e.g. 8-10 TDX). Ethylene-acrylates are of the general chemical formula of $CH_2=C(R^1)CO_2R^2$ where $R^1$ can be hydrogen or an alkyl group of 1-8 carbon atoms and $R^2$ is an alkyl group of 1-8 carbon atoms. Ethylene-acrylate copolymers contemplated for this invention may be based on ethylene-acrylate, ethylene-methacrylate, ethylene-n-butyl acrylate-glycidyl methacrylate, ethylene-glycidyl methacrylate, ethylene-butyl-acrylate, ethylene acrylic esters, or blends thereof. Ethylene vinyl acetate (EVA) and ethylene methacrylate (EMA) can also be contemplated. Other similar materials may also be contemplated. As described in U.S. Pat. No. 7,354,973, suitable compositions of the ethylene-acrylate copolymers can be about 20-95 wt % ethylene content copolymerized with about 3-70 wt % n-butyl acrylate and about 0.5-25 wt % glycidyl methacrylate monomers. A particularly suitable ethylene-acrylate copolymer of this type is one produced by E. I. DuPont de Nemours and Company Packaging and Industrial Polymers Biomax® Strong 120. This additive has a density of about 0.94 g/cm$^3$, a melt flow rate of about 12 g/10 minutes at 190° C./2.16 kg weight, a melting point of about 72° C., and a glass transition temperature of about −55° C. Other suitable ethylene-acrylate copolymer impact modifiers commercially available are: Dupont Elvaloy® PTW, Rohm & Haas, Inc. BPM500, and Arkema, Inc. Biostrength® 130.

Suitable amounts of ethylene-acrylate copolymer to be blended in the crystalline PLA-containing core layer may be from 2-10 wt % of the core layer, preferably 2-7 wt % and more preferably, 3-5 wt %. At these concentrations, acceptable clarity of the biaxially oriented film is maintained. Too much ethylene-acrylate may cause haziness; too little may not enable transverse orientation at 8-10×. Blending into the core layer can be done most economically by dry-blending the respective resin pellets; it is contemplated that more aggressive blending, such as melt-compounding via single-screw or twin-screw, can result in better dispersion of the ethylene-acrylate copolymer throughout the PLA matrix.

To obtain the matte or opaque appearance of the oriented PLA film, an amount of inorganic antiblock particles may be added to the core layer of the laminate film. An amount of an inorganic antiblock agent can be added in the amount of 300-50,000 ppm (0.03-5.0 wt %) of the core resin layer, preferably 500-5000 ppm, and even more preferably, 1000-2000 ppm. Preferred types of antiblock include spherical sodium aluminum calcium silicates or an amorphous silica of nominal 6 μm average particle diameter, but other suitable inorganic antiblocks can be used including calcium carbonate, talc, mica, crosslinked silicone polymer or polymethylmethacrylate, and ranging in size from 2 μm to 6 μm. Particularly preferred is spherical sodium aluminum calcium silicate of nominal 3.0 μm diameter size manufactured by Mizusawa Industrial Chemicals under the tradename Silton® JC-30. Silton® JC-30 has typical physical properties of: bulk density of 0.70 g/cm$^3$, average particle size of 2.9 μm, refractive index 1.50, specific surface area 18 m$^2$/g, Hunter brightness of 96%, and oil absorption of 45 ml/100 g.

Figure 2:
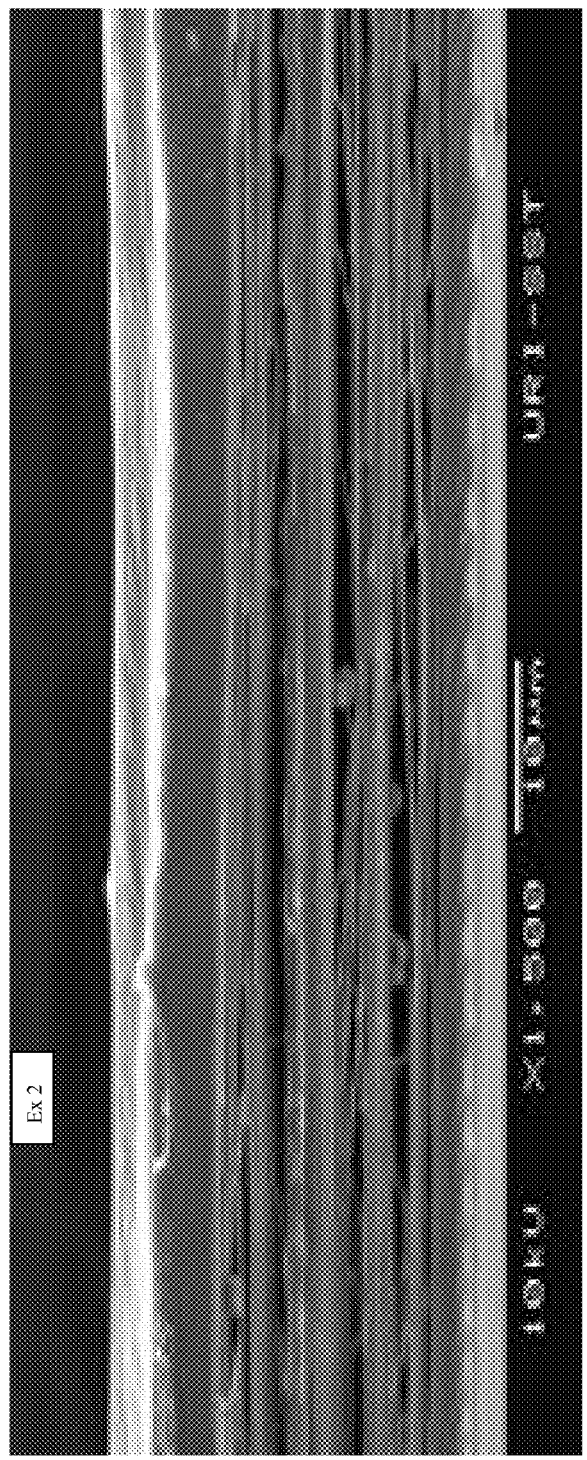
FIG. 2 is a SEM image of a cross section of the film of Ex. 2 showing significantly more cavitation around the antiblock particles than FIG. 1.

Without being bound by any theory, it is believed that when the film is biaxially oriented, particularly at relatively low transverse orientation temperatures, cavitation occurs around the inorganic particles within the core layer. The degree of cavitation imparts the matte or opaque appearance of the film: at a low degree of cavitation, the film has a matte appearance; at a higher degree of cavitation, the film has an opaque appearance. This cavitation has been observed with scanning electron microscopy as shown in FIGS. 1 and 2 and by changes in measurement of the film's density (Table 1). What is surprisingly found, however, is that such a relatively small amount of inorganic particle loading—e.g. 1000 ppm or 0.10 wt % in the PLA core layer—can cause this cavitation resulting in a matte or opaque appearance. In this way, a matte or opaque PLA film can be made using inexpensive cavitating agents and processing conditions and while also maintaining biodegradable or compostability properties.

In the embodiment of a 2-layer coextruded multilayer film, the core resin layer can be surface treated on the side opposite the skin layer with either an electrical corona-discharge treatment method, flame treatment, atmospheric plasma, or a corona discharge in a controlled atmosphere of nitrogen, carbon dioxide, or a mixture thereof, with oxygen excluded and its presence minimized. The latter method of corona treatment in a controlled atmosphere of a mixture of nitrogen and carbon dioxide is particularly preferred. This method results in a treated surface that includes nitrogen-bearing functional groups, preferably at least 0.3 atomic % or more, and more preferably, at least 0.5 atomic % or more. This treated core layer is then well suited for subsequent purposes of metallizing, printing, coating, or laminating.

In this embodiment of a 2-layer laminate film, it is also possible to add optional amounts of migratory slip agents such as fatty amides and/or silicone oils in the core layer to aid further with controlling coefficient of friction (COF) and web handling issues. Suitable types of fatty amides are those such as stearamide or erucamide and similar types, in amounts of 100-1000 ppm of the core. Preferably, stearamide is used at 400-600 ppm of the core layer. A suitable silicone oil that can be used is a low molecular weight oil of 350 centistokes which blooms to the surface readily at a loading of 400-600 ppm of the core layer. However, if it is desired that the films are used for metalizing, or high definition process printing, it is recommended that the use of migratory slip additives be avoided in order to maintain metallized barrier properties and adhesion or to maintain high printing quality in terms of ink adhesion and reduced ink dot gain. In this case, it is recommended that coefficient of friction control and web handling be resolved using inorganic antiblock particles similar to those already described. (In fact, the antiblocks described for imparting the matte/opaque appearance can do double duty for COF control.)

The coextruded skin layer can be a heat sealable resin layer including an amorphous polylactic acid polymer. As described earlier, the amorphous PLA is preferably based on a L-lactide isomer with D-lactide content of greater than 10 wt %. A suitable amorphous PLA to use is Natureworks® Ingeo™ 4060D grade. This resin has a relative viscosity of about 3.25-3.75, $T_g$ of about 52-58° C., seal initiation temperature of about 80° C., density of about 1.24 g/cm$^3$, a D-lactide content of about 12 wt %, and a maximum residual lactide in the polylactide polymer of about 0.30% as determined by gas chromatography. Molecular weight $M_w$ is about 180,000. The preferred amount to be used as a heat sealable skin layer is about 100 wt % of the layer. It is also preferred to add an amount of inorganic antiblock to this layer to aid in web-handling, COF control, film winding, and static control, among other properties. Suitable amounts would be about 1000-5000 ppm of the heat sealable resin layer, preferably 3000-5000 ppm.

Preferred types of antiblock are spherical crosslinked silicone polymer such as Toshiba Silicone's Tospearl® grades of polymethlysilsesquioxane of nominal 2.0 and 3.0 μm sizes. Alternatively, sodium aluminum calcium silicates of nominal 3 μm in diameter can also be used (such as Mizusawa Silton® JC-30), but other suitable spherical inorganic antiblocks can be used including polymethylmethacrylate, silicas, and silicates, and ranging in size from 2 μm to 6 μm. Migratory slip agents such as fatty amides or silicone oils can also be optionally added to the heat seal resin layer of types and quantities mentioned previously if lower COF is desired. However, if the films of this invention are desired to be used for metallizing or high definition process printing, it is recommended that the use of migratory slip additives be avoided or minimized in order to maintain metallized barrier properties and metal adhesion or to maintain high printing quality in terms of ink adhesion and reduced ink dot gain.

A heat sealable resin layer can be coextruded on one side of the core layer, the heat sealable layer having a thickness after biaxial orientation of between 0.5 and 5 μm, preferably between 1.0 and 2.0 µm. The core layer thickness can be of any desired thickness after biaxial orientation, but preferred and useful thicknesses are in the range of 10 µm to 100 µm, preferably 13.5 µm to 25 µm, and even more preferably 15.0 µm-20.0 µm.

The coextrusion process may include a multi-layered compositing die, such as a two- or three-layer die. In the case of a 2-layer coextruded film, a two-layer compositing die can be used. In the case of a 3-layer coextruded film, the polymer blend core layer can be sandwiched between the heat sealable resin layer and a third layer using a three-layer compositing die. One embodiment is to coextrude in only two layers with only the blended core layer and the heat sealable layer coextruded on one side of the core layer. In this case, the core layer side opposite the heat sealable layer is further modified by adding inorganic antiblock particles into the core layer itself as explained previously and can also be surface-treated via a discharge-treatment method if so desired. In a three-layer coextruded film embodiment, a third layer on the side of the core layer opposite the heat sealable layer can also be modified with antiblock particles in lieu of the core layer and also be surface-treated via a discharge-treatment method as desired. Selection of the third layer can include any polymer typically compatible with the core layer resin such as a crystalline PLA resin, amorphous PLA resin, or blends thereof. Typically, selection of this third layer's formulation is to enhance the coextruded film's printability, appearance, metallizability, winding, laminating, sealability, or other useful characteristics. Useful thickness of this third layer after biaxial orientation can be similar to the thicknesses cited for the heat sealable skin layer, preferably 1.0-2.0 µm.

The surface opposite the heat sealable layer can be surface-treated if desired with either a corona-discharge method, flame treatment, atmospheric plasma, or corona discharge in a controlled atmosphere of nitrogen, carbon dioxide, or a mixture thereof which excludes oxygen. The latter treatment method in a mixture of $CO_2$ and $N_2$ only is preferred. This method of discharge treatment results in a treated surface that includes nitrogen-bearing functional groups, preferably 0.3% or more nitrogen in atomic %, and more preferably 0.5% or more nitrogen in atomic %. This discharge-treated surface can then be metallized, printed, coated, or extrusion or adhesive laminated. Preferably, it is printed or metallized, and more preferably, metallized.

If the three-layer coextruded film embodiment is chosen, the third layer may be coextruded with the core layer opposite the heat sealable resin layer, having a thickness after biaxial orientation between 0.5 and 5 µm, preferably between 0.5 and 3 µm, and more preferably between 1.0 and 2.0 µm. A suitable material for this layer is a crystalline PLA or amorphous PLA or blends thereof, as described earlier in the description. If amorphous PLA is used, the same suitable resin grade used for the heat sealable layer may be employed (e.g. Natureworks® 4060D). If crystalline PLA is used, the same suitable grades as used for the core layer may be employed such as Natureworks® 4042D or 4032D, with the 4032D grade preferred in general. Additionally, blends of both crystalline and amorphous PLA may be contemplated for this layer, similar to previously described formulations for the core layer, but not limited to those descriptions. For example, the ratio of amorphous PLA to crystalline PLA for this third skin layer can range from 0-100 wt % amorphous PLA and 100-0 wt % crystalline PLA. In those embodiments in which crystalline PLA is used in the third layer, an amount of ethylene-acrylate copolymer may be used as described previously, in order to ensure the ability to transversely orient this layer at high orientation rates. Suitable amounts of ethylene-acrylate copolymer to use in this skin layer is 2-10 wt %, preferably 2-7 wt % and, more preferably, 3-5 wt %. The use of various blends of amorphous and crystalline PLA in this layer may make it more suitable for printing, metallizing, coating, or laminating, and the exact ratio of the blend can be optimized for these different applications.

This third layer may also advantageously contain an anti-blocking agent and/or slip additives for good machinability and a low coefficient of friction in about 0.01-0.5% by weight of the third layer, preferably about 250-1000 ppm. Preferably, non-migratory inorganic slip and/or antiblock additives as described previously should be used to maintain gas barrier properties and metal adhesion if metallizing, or ink wetting and ink adhesion if printing.

In addition, another embodiment that can be considered is to replace the heat sealable amorphous PLA layer with a non-sealable PLA layer. In this variation, amorphous or crystalline PLA may be used, or blends thereof. In the case of making this layer non-sealable, preferably crystalline PLA should be used, either by itself or as the majority component of a blend with amorphous PLA. As discussed previously, if crystalline PLA is used for this layer, an amount of ethylene-acrylate copolymer may be used as part of this layer to aid high transverse orientation rates. Suitable amounts of ethylene-acrylate copolymer to use in this skin layer is 2-10 wt %, preferably 2-7 wt % and, more preferably, 3-5 wt %. Preferably, non-migratory inorganic slip and/or antiblock additives as described previously should be used to maintain gas barrier properties and metal adhesion if metallizing, or ink wetting and ink adhesion if printing. It is also preferred to add an amount of inorganic antiblock to this layer to aid in web-handling, COF control, film winding, and static control, among other properties. Suitable amounts would be about 1000-5000 ppm of the this non-eat sealable resin layer, preferably 3000-5000 ppm.

Preferred types of antiblock are spherical crosslinked silicone polymer such as Toshiba Silicone's Tospearl® grades of polymethlysilsesquioxane of nominal 2.0 and 3.0 µM sizes. Alternatively, sodium aluminum calcium silicates of nominal 3 µm in diameter can also be used (such as Mizusawa Silton® JC-30), but other suitable spherical inorganic antiblocks can be used including polymethylmethacrylate, silicas, and silicates, and ranging in size from 2 µm to 6 µm. It is often preferred to discharge-treat the exposed side of this layer so as to enable adequate adhesion and wet-out of adhesives or inks or coatings to this side. In particular, cold seal latexes can be applied to this discharge-treat surface.

The multilayer coextruded film of the invention can be made either by sequential biaxial orientation or simultaneous biaxial orientation, which are well-known processes in the art. In the case of sequential orientation, a 3-meter wide sequential orientation film-making line may be used. The multilayer coextruded laminate sheet may be coextruded at melt temperatures of about 170° C. to 230° C. and cast and pinned—using electrostatic pinning—onto a cooling drum whose surface temperature was controlled between 15° C. and 26° C. to solidify the non-oriented laminate sheet at a casting speed of about 13-17 mpm. The non-oriented laminate sheet may be stretched first in the longitudinal direction at about 60° C. to 70° C. at a stretching ratio of about 2 to about 4 times the original length, preferably about 2.4-3.0 times, using differentially heated and sped rollers and the resulting stretched sheet is heat-set at about 45-55° C. on annealing rollers and cooled at about 25-40° C. on cooling rollers to obtain a uniaxially oriented laminate sheet. The uniaxially oriented laminate sheet is then introduced into a tenter at a linespeed of about 40-50 mpm and preliminarily heated between 65° C. and 75° C., and stretched in the transverse direction at a temperature of about 75-95° C., and preferably 75-80° C. to induce the cavitation needed for matte or opaque appearance, and at a stretching ratio of about 3 to about 12 times, preferably 6-10 times (which may require the use of a stretching aid as described previously), the original width and then heat-set or annealed at about 90-135° C., and preferably 115-130° C., to reduce internal stresses due to the orientation and minimize shrinkage and give a relatively thermally stable biaxially oriented sheet. TD orientation rates may be adjusted by moving the transverse direction rails in or out per specified increments based on the TD infeed rail width settings and width of the incoming machine-direction oriented film. The biaxially oriented film has a total thickness between 10 and 100 µm, preferably between 15 and 30 µm, and most preferably between 20 and 25 µm.

Without being bound by any theory, it is believed that when the film is biaxially oriented, particularly at relatively low transverse orientation temperatures and certain machine direction orientation rates, cavitation occurs around the inorganic particles within the core layer. The degree of cavitation imparts the matte or opaque appearance of the film: at a low degree of cavitation, the film has a matte appearance; at a higher degree of cavitation, the film has an opaque appearance. This cavitation has been observed with scanning electron microscopy (FIGS. 1 and 2) and by changes in measurement of the film's density (Table 1). As the film becomes more cavitated, it's density decreases and it's apparent thickness will increase due to the lofting affect of cavitation.

The discharge-treated surface opposite the heat sealable resin layer may be metallized. The unmetallized laminate sheet is first wound in a roll. The roll is placed in a vacuum metallizing chamber and the metal vapor-deposited on the discharge-treated metal receiving layer surface. The metal film may include titanium, vanadium, chromium, manganese, iron, cobalt, nickel, copper, zinc, aluminum, gold, or palladium, the preferred being aluminum. Metal oxides can also be contemplated, the preferred being aluminum oxide. The metal layer can have a thickness between 5 and 100 nm, preferably between 20 and 80 nm, more preferably between 30 and 60 nm; and an optical density between 1.5 and 5.0, preferably between 2.0 and 4.0, more preferably between 2.2 and 3.2. The metallized film is then tested for oxygen and moisture gas permeability, optical density, metal adhesion, metal appearance and gloss, heat seal performance, tensile properties, thermal dimensional stability, and can be made into a laminate structure.

This invention will be better understood with reference to the following examples, which are intended to illustrate specific embodiments within the overall scope of the invention.

Example 1

A 2-layer coextruded biaxially oriented PLA film was made using sequential orientation on a 3.0 meter wide tenter frame line, including a core layer substantially of Natureworks® 4032D at about 64 wt % of the core layer and dry-blended with about 30 wt % of Natureworks® 4060D and about 4 wt % of DuPont Biomax® 120 ethylene-acrylate copolymer as a process aid for high transverse orientation. Also dry-blended into the core layer was an amount of antiblock masterbatch (called "PLA10A" made by the inventors) made by melt-extruding Natureworks® 4060D with Silton® JC-30 nominal 3 µm particle size spherical sodium calcium aluminum silicate antiblock at a masterbatch loading of 5 wt % JC-30 of the masterbatch. About 2 wt % of this antiblock masterbatch PLA10A was added to the core layer for a nominal loading of about 1000 ppm JC-30 in the core layer. The coextruded heat sealable skin layer includes substantially of Natureworks® 4060D at about 94 wt % of the skin layer. PLA10A antiblock masterbatch of 3 µm JC-30 was also added to the coextruded heat sealable skin layer at about 6 wt % of the skin layer for an effective antiblock loading of 3000 ppm.

The total thickness of this film substrate after biaxial orientation was ca. 100 G or 1.0 mil or 25 µm. The thickness of the respective heat sealable resin layer after biaxial orientation was ca. 10 G (2.5 µm). The thickness of the core layer after biaxial orientation was ca. 90 G (22.5 µm). The skin layer and the core layer were melt coextruded together through a flat die to be cast on a chill drum using an electrostatic pinner. The formed cast sheet was passed through a machine-direction orienter to stretch in the machine direction (MD) at ca. 2.4× stretch ratio in the longitudinal direction. This was followed by transverse direction (TD) stretching at ca. 10.6× stretch ratio in the tenter oven at a stretching temperature of about 175° F. (79.4° C.) and heat-set or annealed to reduce film shrinkage effects at ca. 240° F. (115° C.). The resultant biaxially oriented film was subsequently discharge-treated on the skin layer's surface opposite the heat sealable skin layer via corona treatment. The film was then wound up in roll form.

Example 2

The process of Example 1 was repeated except that the machine orientation rate was changed to 2.7×.

Example 3

The process of Example 1 was repeated except that the machine orientation rate was changed to 3.0×.

Comparative Example 1

The process of Example 1 was repeated except that the amount of 4032D was 96 wt % of the core and no amorphous 4060D PLA was added, and no Silton® JC-30 antiblock masterbatch PLA10A was added. The machine orientation rate was at 3.0×, transverse orientation rate was 8.0×, and the transverse orientation temperature zone was raised to about 195° F. (90.6° C.).

Comparative Example 2

The process of Example 1 was repeated except that the machine direction orientation rate was about 3.0×, the transverse orientation rate obtained was about 8.0×, and the transverse orientation temperature zone was raised to about 195° F. (90.6° C.).

Figure 3:
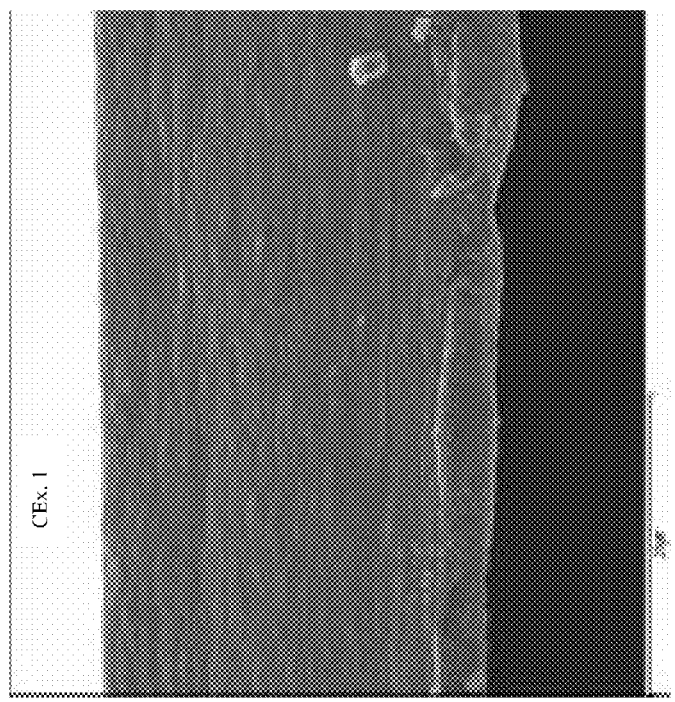
FIG. 3 is a SEM image of a cross section of the film of CEx. 1 showing no cavitation.

The unlaminated properties of the Examples ("Ex") and Comparative Examples ("CEx.") are shown in Table 1 and FIGS. 1, 2 and 3.

TABLE 1

| Sample | Layer Composition wt % of the layer | | MDX | TDX | TD str zone temp °C. | Gloss 60° A-side | Gloss 20° B-side | Haze % | Light Transm % | Film Density |
|---|---|---|---|---|---|---|---|---|---|---|
| | Layer A (Core) | Layer B (Heat Seal) | | | | | | | | |
| Ex. 1 | PLA 4032D (64%) PLA 4060D (30%) Biomax 120 (4%) PLA10A (2%) | PLA 4060D (94%) PLA10A (6%) | 2.4 | 10.6 | 79.4 | 57 | 10 | 10.7 | 83 | 1.23 |
| Ex. 2 | Same as Ex. 1 | Same as Ex. 1 | 2.7 | 10.6 | 79.4 | 76 | 14 | 10.9 | 41 | 1.20 |
| Ex. 3 | Same as Ex. 1 | Same as Ex. 1 | 3.0 | 10.6 | 79.4 | 72 | 13 | 10.8 | 52 | 1.21 |
| CEx. 1 | PLA 4032D (96%) Biomax 120 (4%) | Same as Ex. 1 | 3.0 | 8 | 90.6 | 107 | 59 | 2.8 | 92.5 | 1.25 |
| CEx. 2 | Same as Ex. 1 | Same as Ex. 1 | 3.0 | 8 | 90.6 | 102 | 55 | 3.4 | 91.1 | 1.25 |

As Table 1 shows, Example 1 (Ex. 1)—which includes a core layer (A) blend of crystalline and amorphous PLA with a small amount of Biomax 120 processing aid and antiblock masterbatch (i.e. 1000 ppm JC-30 3.0 um sodium calcium aluminum silicate) and a skin layer (B) of amorphous PLA with antiblock masterbatch (i.e. 3000 ppm JC-30)—was biaxially oriented at an MDX of 2.4 and high TDX of 10.6 at a low TD stretching temperature of ca. 79° C. The appearance had unexpectedly low transparency of 83% light transmission with high haze of 10.7%. Additionally, Ex. 1 A-side gloss was very low, giving the film a translucent, matte appearance. FIG. 1 is a SEM image of the cross-section of the film thickness of Ex. 1. This image reveals some slight cavitation and cracking around the antiblock particles. Density of the film was slightly lower at 1.23 than the expected 1.25 for polylactic acid resin. This slight degree of cavitation is believed to have caused the film to exhibit a uniform, consistent, and attractive matte appearance.

Example 2 (Ex. 2) was the same film composition as Ex. 1, except that the film was oriented with a higher MDX ratio of 2.7, while keeping TDX ratio and stretch temperatures the same as Ex 1. As Table 1 shows, simply by increasing MDX stretch ratio rendered the film to become significantly and unexpectedly more opaque as shown by low light transmission of 41%. Film density also decreased significantly to 1.20. In addition, FIG. 2 is a SEM image of a cross section of the film of Ex. 2. This cross-section revealed significantly more cavitation around the antiblock particles. This increased cavitation is what is believed to have rendered the film opaque and whitish in appearance.

Example 3 (Ex. 3) used the same film composition as Ex. 1, except that the film was oriented with a higher MDX ratio of 3.0, while keeping TDX ratio and stretch temperatures the same as Ex. 1. As Table 1 shows, simply by increasing MDX stretch ratio rendered the film to become significantly and unexpectedly more opaque as shown by low light transmission of 52% and resulting in a lower film density of 1.21 compared to Ex. 1.

Comparative Example 1 (CEx. 1) used a core layer (A) formulation of 96 wt % of the core crystalline PLA (PLA4032D) with 4 wt % of the core Biomax 120 stretching aid. No antiblock particle was introduced into the core layer. The skin layer (B) was kept the same formulation as the previous Examples. This film composition was stretched at MDX of 3.0 ratio but lower TDX ratio of 8.0 and warmer TD stretch temperature of 90.6° C. This film was transparent with low haze less than 5%, high A-side gloss over 90%, and high light transmission of over 90%. In addition, film density was about 1.25, similar to that of polylactic acid polymer indicating no cavitation. FIG. 3, which is a SEM image of a cross-section of the film of CEx. 1 confirmed this.

Comparative Example 2 (CEx. 2) used core layer (A) and skin layer (B) formulations the same as Ex. 1-3, but was stretched at 3.0 MDX ratio but lower TDX ratio of 8.0 and warmer TD stretch temperature of 90.6° C. This film was transparent with low haze less than 5%, high A-side gloss over 90%, and high light transmission of over 90%. Film density was about 1.25, similar to that of polylactic acid polymer indicating no cavitation.

As the Examples show above, the combination of small amounts of inexpensive antiblock particle, TD orientation draw ratio, low TD stretch temperatures, and degree of MD orientation can unexpectedly produce uniform matte and opaque biaxially oriented PLA films.

Test Methods

The various properties in the above examples were measured by the following methods:

Transparency of the film was measured by measuring the haze of a single sheet of film using a hazemeter model like a BYK Gardner "Haze-Gard Plus®" substantially in accordance with ASTM D1003. Preferred values for haze was about 8% or higher for a matte appearance.

Gloss of the film was measured by measuring the desired side of a single sheet of film via a surface reflectivity gloss meter (BYK Gardner Micro-Gloss) substantially in accordance with ASTM D2457. The A-side or core layer side was measured at a 60° angle; the B-side or skin layer side was measured at a 20° angle. Preferred value for A-side gloss was less than 80% for a matte appearance, more preferably, less than 75%.

Light transmission of the film was measured by measuring light transmission of a single sheet of film via a light transmission meter (BYK Gardner Haze-Gard Plus) substantially in accordance with ASTM D 1003. Preferred values for light transmission was less than 90% for a matte film and 70% or less for an opaque film.

Film density was calculated by cutting a stack of 10 sheets of film using a die-cutter and die of 2.5 inch (6.35 cm) diameter for a surface area of 4.91 in$^2$ (31.67 cm$^2$). This die-cut stack of film is weighed on an analytical balance, thickness measured using a micrometer, and the density of the film is then calculated.

For scanning electron microscopy, film samples were mounted in epoxy, freeze-fractured by immersing in liquid nitrogen, plasma-etched and carbon-coated prior to analysis. Microscopy was done at 1000-2000× magnification.

Transverse orientation obtained was measured by varying the stretching and outlet zones' chain rail widths in relation to the in-feed rail settings of the transverse direction orientation (TDO) oven section. The comparison in width between inlet and stretch was used to calculate TD orientation ratio obtained.

This application discloses several numerical ranges in the text and figures. The numerical ranges disclosed inherently support any range or value within the disclosed numerical ranges even though a precise range limitation is not stated verbatim in the specification because this invention can be practiced throughout the disclosed numerical ranges.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

We claim:

1. A biaxially oriented laminate film comprising:
   a core layer comprising a crystalline polylactic acid polymer of 90-100 wt % L-lactic acid units, and a matting agent consisting of antiblock particles in an amount of 0.03-0.2 wt % of the core layer,
   wherein the core layer contains only a single matting agent consisting of antiblock particles, the film is biaxially oriented to impart a degree of cavitation around the antiblock particles such that the core layer exhibits a gloss at 60° of less than 80% and wherein the film possesses light transmission of less than 90%.

2. The film of claim 1, further comprising a heat sealable layer comprising an amorphous polylactic acid polymer having greater than 10 wt % D-lactic acid units and meso-lactide units disposed on one side of the core layer.

3. The film of claim 2, wherein the heat sealable layer further comprise antiblock particles.

4. The film of claim 2, further comprising a third layer comprising polylactic acid polymer disposed on a side of the core layer opposite the heat sealable layer.

5. The film of claim 4, wherein the third layer is a printing layer, metal receiving layer, or coating receiving layer.

6. The film of claim 1, wherein the core layer further comprises ethylene-acrylate copolymer.

7. The film of claim 1, wherein the film is transverse oriented at a rate of 6-10×.

8. The film of claim 1, wherein the antiblock particles are selected from the group consisting of amorphous silicas, aluminosilicates, sodium calcium aluminum silicates, crosslinked silicone polymers, and polymethylmethacrylates, calcium carbonate, talcs, and micas.

9. The film of claim 1, further comprising a skin layer comprising crystalline polylactic acid polymer of 90-100 wt % L-lactic acid units disposed on one side of the core layer.

10. The film of claim 1, wherein the film further comprises a metallized surface.

11. A biaxially oriented laminate film comprising:
    a core layer comprising a crystalline polylactic acid polymer of 90-100 wt % L-lactic acid units, and a matting agent consisting of antiblock particles in an amount of 0.03-0.2 wt % of the core layer, wherein the core layer contains only a single matting agent consisting of antiblock particles; and
    a heat sealable layer comprising an amorphous polylactic acid polymer having greater than 10 wt % D-lactic acid units and meso-lactide units disposed on one side of the core layer.

12. The film of claim 11, wherein the film is biaxially oriented to impart a degree of cavitation around the antiblock particles such that the core layer exhibits a gloss at 60° of less than 80% and wherein the film possesses light transmission of less than 90%.

13. The film of claim 11, wherein the core layer further comprises ethylene-acrylate copolymer.

14. The film of claim 11, wherein the film is transverse oriented at a rate of 6-10×.

15. The film of claim 11, wherein the antiblock particles are selected from the group consisting of amorphous silicas, aluminosilicates, sodium calcium aluminum silicates, crosslinked silicone polymers, and polymethylmethacrylates, calcium carbonate, talcs, and micas.

16. The film of claim 11, wherein the heat sealable layer further comprise antiblock particles.

17. The film of claim 11, further comprising a third layer comprising polylactic acid polymer disposed on a side of the core layer opposite the heat sealable layer.

* * * * *